F. P. McCOLL.
ROLL TOP CAN.
APPLICATION FILED JAN. 18, 1912.
1,039,164.
Patented Sept. 24, 1912.
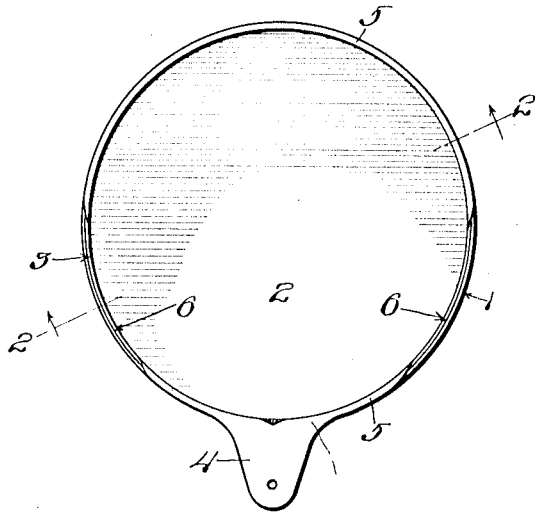
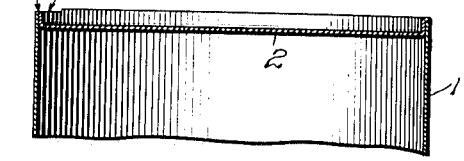
Witnesses:
Harry S. Gaither
Ruby V. Brydges
Inventor
Francis P. McColl
by Chamberlin & Brendenreich
Attys

UNITED STATES PATENT OFFICE.

FRANCIS P. McCOLL, OF ST. ANDREWS, NEW BRUNSWICK, CANADA, ASSIGNOR TO AMERICAN KEY CAN COMPANY, OF CHICAGO, ILLINOIS, A CORPORATION OF NEW JERSEY.

ROLL-TOP CAN.

1,039,164.  Specification of Letters Patent.  Patented Sept. 24, 1912.

Application filed January 18, 1912. Serial No. 671,782

*To all whom it may concern:*

Be it known that I, FRANCIS P. McCOLL, a citizen of the United States, residing at St. Andrews, county of Charlotte, Province of New Brunswick, Canada, have invented a certain new and useful Improvement in Roll-Top Cans, and declare the following to be a full, clear, and exact description of the same, such as will enable others skilled in the art to which it pertains to make and use the same, reference being had to the accompanying drawings, which form a part of this specification.

In the ordinary roll top can wherein the entire top or cover is adapted to be removed by rolling it up on a suitable key, the soldered joint between the top or head and the can body lies in a plane extending transverse to the axis of the body. Such a joint is weak under internal pressure in the can because only the tensile strength of a narrow line of solder is opposed to the force tending to lift the top or cover. The strongest construction which can be obtained is one in which the top or head is cup-shaped so as to bring the solder between the head and an annular band or strip around the interior of the can body which engages with the head. In such a joint the band of solder must be sheared, and as a whole, before the cover can be lifted, and cannot be progressively disrupted under internal pressure in the can as is the case in the old form of joint.

There are several problems which must be solved in order to make a commercially-successful roll top with the width of the joint running longitudinally of the can and the present invention has for its object to solve these problems in a simple and effective manner.

The various features of novelty whereby my invention is characterized will hereinafter be pointed out with particularity in the claims; but for a full understanding of my invention and of its object and advantages, reference may be had to the following detailed description taken in connection with the accompanying drawing, wherein:

Figure 1 is a plan view of a round can having a roll top arranged in accordance with a preferred form of my invention; Fig. 2 is a section on line 2—2 of Fig. 1; and Fig. 3 is a side or edge view of the top or head detached from the can body.

My invention is particularly adapted to round cans and I have illustrated it in the drawing as embodied in such a can, although it is applicable to cans of any shape.

Referring to the drawing, 1 represents a can body and 2 a cup-shaped head fitting into the end of the body with its mouth directed outwardly. The soldered joint 3, is between the periphery of the head and the narrow band around the exterior of the body which engages with the head; such a joint being powerful under internal pressure because it must be sheared longitudinally of the can in order to tear the head loose instead of opposing the tearing stresses simply with the tensile strength of a narrow line of solder. The head is provided with a tongue, 4, which preferably projects laterally from the edge of the head at one side of the mouth thereof.

If the head were made in the shape of a simple cup uniformity of product would be practically impossible since the head would enter farther into one can body than into another and would often enter askew, projecting farther into the body at one side than at the opposite side. It is therefore necessary to provide some simple means which will cause the heads always to assume definite positions in the cans when the parts are assembled, and which will not interfere with the successful rolling up of the head by means of the usual key. The tongue serves this purpose at one side of the head if the head is so formed that the tongue projects later- with the successful rolling up of the head by means of the usual key. The tongue serves this purpose at one side of the head if the head is so formed that the tongue projects at one side of the head if the head is so formed that the tongue projects laterally from the edge bounding the mouth. In addition to the tongue the head may be provided with a narrow fin or flange just wide enough to engage securely with the top edge of the can body and limit the movement of the head into the body. Such a head may be rolled up successfully if the conditions are just right, but if the tin plate be of a structure which is easily torn or if the grain of the metal extends in the wrong direction, the head will buckle after it has been partially rolled up and will tear across instead of being separated from the can at the joint. I have found that this objection may be overcome and the roll top be rendered commercially successful by cutting away or dispensing with the flange at the points of greatest resistance, leaving it intact only at points of lesser resistance.

Referring again to the drawing, 5 represents a narrow flange or fin which is adapted to rest on the end of the can body when the head is introduced into the body. The flange offers no obstacle to rolling up the head in the vicinity of the tongue and may be allowed to remain for some distance on each side of the tongue. However, after the head has been rolled up for an angular distance of thirty or forty degrees on each side of the initial position of the tongue, the flange is apt to cause trouble and therefore, from these points to points about ninety degrees on each side of the initial position of the tongue I cut away or otherwise dispense with the flange as indicated at 6. With this arrangement the head will roll up smoothly across the areas of greatest resistance without danger of buckling and tearing. After the half-way point is reached the resistance to separating the head from the body and rolling it up diminishes and the flange on the last half of the head to be rolled up is not a disadvantage.

The dimensions which I have given are of course only illustrative and the unflanged portion may be increased so as to leave only a small lip or lips placed at areas of lesser resistance and acting with the tongue effectually to limit the entry of the head into the body.

I claim:

1. In a roll-top can, a can body, a cup-shaped head fitting into one end of the body with its mouth directed outwardly, a tongue on the head for rolling it up, and said head having laterally-projecting flange portions at points of lesser resistance to the rolling up of the head and being unflanged at points of greatest resistance to rolling, said flange portions resting upon the edge of the can body and limiting the extent to which the head can enter the body.

2. In a roll-top can, a can body, a cup-shaped head fitting into and soldered in one end of the body with its mouth directed outwardly, a tongue for rolling up the head projecting laterally from the mouth of the head, and flange portions projecting laterally from the mouth of the head and coöperating with the tongue to limit the extent to which the head can enter the can body, said flange portions being so disposed angularly of the head and relative to the tongue so as to leave the points of greatest resistance to rolling of head unflanged.

In testimony whereof, I sign this specification in the presence of two witnesses.

FRANCIS P. McCOLL.

Witnesses:
FRANK KINSEY,
RUBY V. BRYDGES.